United States Patent [19]

Anderson

[11] Patent Number: 5,321,858
[45] Date of Patent: Jun. 21, 1994

[54] CLOSURE ASSEMBLY FOR A PIT COMMODE

[76] Inventor: Roger K. Anderson, 415 Ridley St., Corydon, Ind. 47112

[21] Appl. No.: 17,608

[22] Filed: Feb. 16, 1993

[51] Int. Cl.$^5$ .............................................. A47K 11/02
[52] U.S. Cl. .................................. 4/460; 4/473; 4/486
[58] Field of Search .................... 4/449, 459, 464–478, 4/485, 486, 436, 438–442, 460

[56] References Cited

U.S. PATENT DOCUMENTS

| | | | |
|---|---|---|---|
| 765,643 | 7/1904 | Tregoning | 4/248 X |
| 2,946,065 | 7/1960 | Smith | 4/459 |

FOREIGN PATENT DOCUMENTS

| | | | |
|---|---|---|---|
| 0017274 | 4/1934 | Australia | 4/466 |
| 0232856 | 8/1960 | Australia | 4/486 |

*Primary Examiner*—Robert M. Fetsuga
*Attorney, Agent, or Firm*—Maurice L. Miller, Jr.

[57] ABSTRACT

An automatic closure assembly for use with an outhouse or pit commode is disclosed which includes a frame having open upper and lower ends attached to the underside of a bench so as to frame an opening therein over which a toilet seat is hingably mounted atop the bench. The assembly also includes a pair of wedge shaped cradle members which are pivotally attached to front and rear surfaces of the frame which tilt in opposite directions from one another so as to open and close a lower end of the frame. The geometry of the cradle members is such that their centers of gravity are substantially spaced apart from their pivot points so as to provide a gravitational bias of each cradle member tending to urge it at all times toward its closed position against the other cradle member so as to seal the bottom end of the frame to inhibit odors from circulating in or about the outhouse when the assembly is not in use. The seat operates a plunger which moves a first linkage so as to tilt one of the cradles from its closed to its open position. A second linkage, which may be a pair of gears, tilts the other cradle in response to movement of the first cradle and in a direction opposite thereto. An air operated cylinder with an adjustable air valve dampens the closing rate of the cradles to prevent their crashing together with great force.

21 Claims, 3 Drawing Sheets

1

CLOSURE ASSEMBLY FOR A PIT COMMODE

BACKGROUND OF THE INVENTION

This invention relates to an automatic closure assembly for an outhouse, compost toilet or pit commode for isolating and sealing a compost pit when not in use for minimizing the escape of odors from the pit into and about the outhouse and surroundings.

Broadly speaking, such closure assemblies have long been known and used in the prior art. See, for example, U.S. Pat. No. 126,745 issued to N. P. Rider on May 14, 1872; U.S. Pat. No. 734,336 issued to W. S. Johnson on Jul. 21, 1903; U.S. Pat. No. 898,225 issued to C. Kelley on Sep. 8, 1908; U.S. Pat. No. 1,210,186 issued to M. M. Marcuse on Dec. 26, 1916; U.S. Pat. No. 1,296,666 issued to G. E. Kinch on Mar. 11, 1919; U.S. Pat. No. 1,442,142 issued to L. L. Fusan on Jan. 16, 1923; U.S. Pat. No. 2,946,065 issued to D. L. Smith on Jul. 26, 1960; U.S. Pat. No. 3,366,976 issued to C. W. Swanson on Feb. 6, 1968; U.S. Pat. No. 3,430,269 issued to T. T. Bradshaw on Mar. 4, 1969; and U.S. Pat. No. 4,054,958 issued to E. G. Widham on Oct. 25, 1977. See also Australian Pat. No. 7782/27 published Mar. 27, 1928; Australian Pat. No. 17,125/28 published Oct. 8, 1929; and Australian Pat. No. 232856 published Aug. 25, 1960.

All of the previously mentioned prior art assemblies include closure means or doors which automatically open and close when the toilet seat is lowered and raised, respectively. But each of these assemblies uses either some type of spring or counterweight or both to actuate the closure. By counterweight, I mean a mass placed to provide a bending moment on an opposite side of a fulcrum or pivot point from the weight of a door or closure tiltable about such fulcrum or pivot point. Thus, the counterweight provides a bending moment acting in a rotational direction which is greater than the bending moment of the door or closure itself and which acts in a direction opposite to the latter bending moment. A spring, of course, is susceptible to aging, rusting, becoming permanently stretched, wearing out or otherwise failing as the result of repeated usage.

By means of the present invention I provide an automatic, normally closed closure assembly for an outhouse toilet which does not employ either springs or counterweights for actuation of the doors but, which nevertheless still utilizes gravity to bias the doors toward a normally closed position.

SUMMARY OF THE INVENTION

It is an object of my invention to provide an automatic closure assembly for a pit commode which is gravitationally biased toward a normally closed position when not in use.

It is a further object of my invention to provide a pit commode closure assembly which contains a relatively uncomplicated mechanical linkage and which does not depend upon either springs or fulcrum opposing counterweights for actuation.

It is another object of my invention to provide a pit commode closure assembly having closure means which is gravitationally biased toward a closed position and whose rate of closure is controlled by means of an air cylinder.

It is yet another object of my invention to provide a pit commode closure assembly having closure means pivotally mounted on a frame whose natural center of gravity is spaced away from its pivot point so as to urge the closure means to tilt about its pivot point under the influence of gravity toward its closed position.

Briefly, in accordance with my invention, there is provided a pit commode closure assembly. The assembly is adapted for use with a bench which defines an opening therein and a toilet seat attached to the bench, which seat is tiltable between a lowered position flush with the bench and at least partially surrounding the opening and a raised position. The assembly includes a frame having an open upper and lower end which is attachable against an underside of the bench so as to frame or surround the opening. Also included is a first and a second closure means which is pivotally connected to the frame for opening and closing the lower end of the frame upon command. Each closure means is tiltable between an open position on a different side of the frame and a closed position against the other closure means so as to register with the lower end of the frame. Each closure means has a center of gravity spaced from its pivot point which gravitationally biases the closure means toward its closed position. Also included is a first linkage means responsive to a movement of the seat from a raised to a lowered position for tilting the first closure means, in opposition to its gravitational bias, from a closed to an open position. A second linkage means is included for tilting the second closure means in response to and in a direction opposite to a direction of movement of the first closure means.

These and other objects, features and advantages of my invention will become apparent to those skilled in the art from the following detailed description and attached drawings upon which, by way of example, only a preferred embodiment of my invention is described and illustrated.

DESCRIPTION OF THE PREFERRED EMBODIMENT

Figure 1:
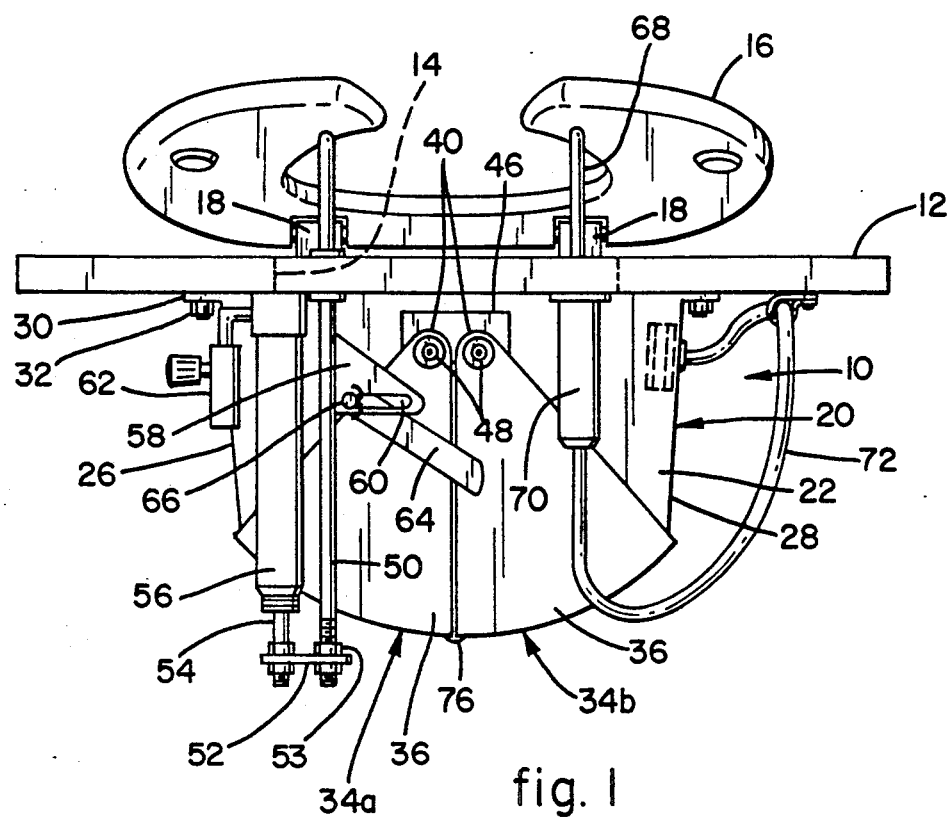
FIG. 1 shows a front elevation view of a pit commode closure assembly while in a closed condition, thus illustrating a preferred embodiment of my invention.
Figure 2:
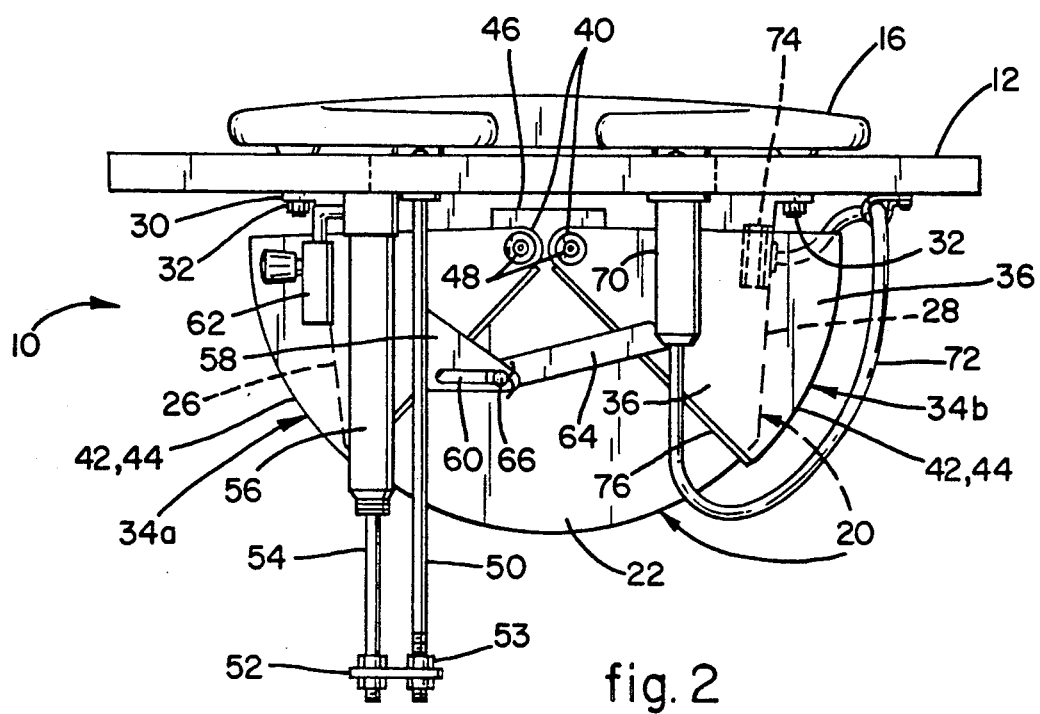
FIG. 2 shows a front elevation view of the assembly of FIG. 1 the same as viewed in the latter mentioned figure except that the assembly is shown in an open condition.
Figure 3:
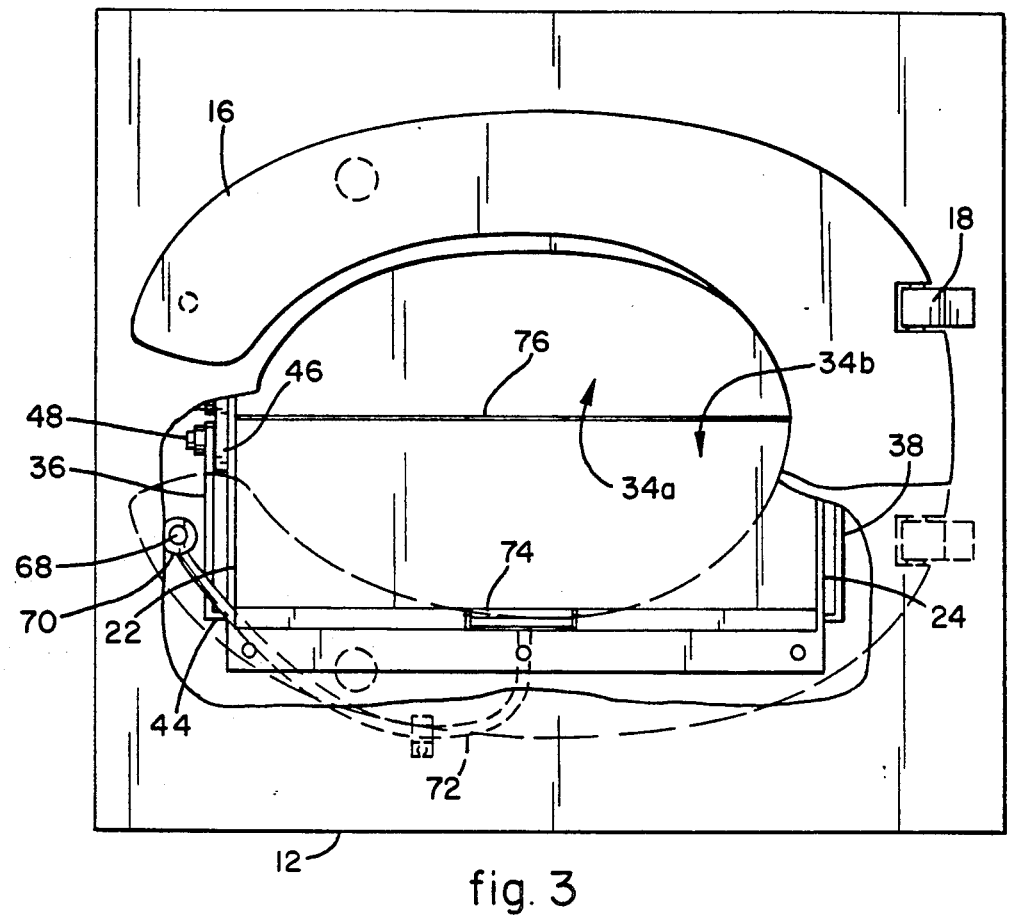
FIG. 3 shows a top plan view of the assembly of FIGS. 1-2 while in a closed condition with portions of the structure upon which it is mounted being torn away to enhance the viewing thereof.
Figure 4:
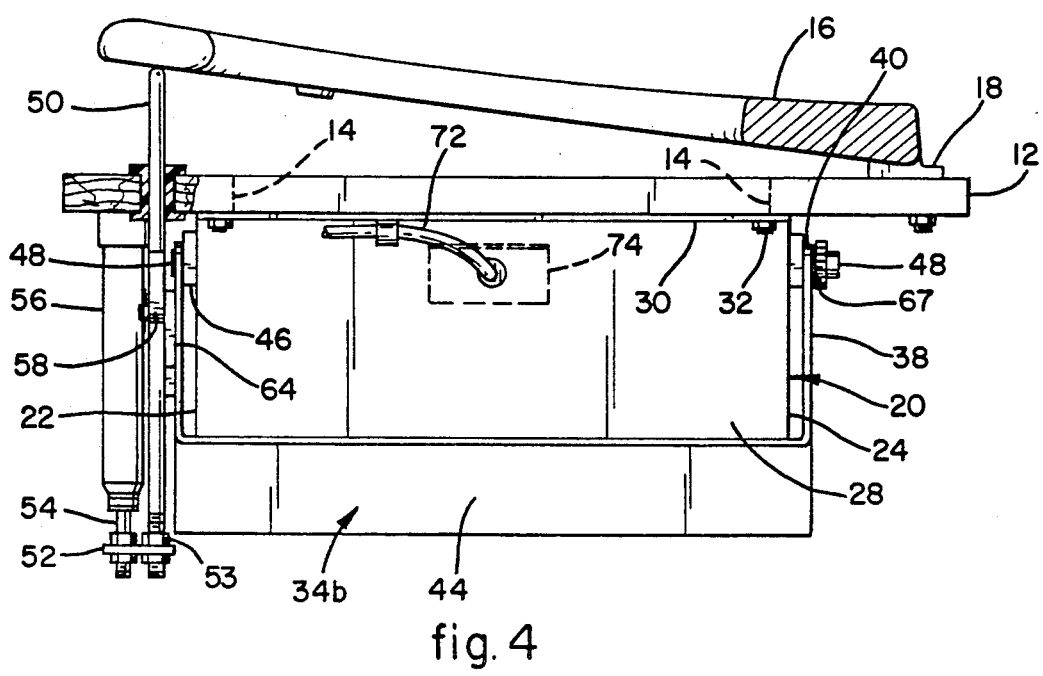
FIG. 4 shows a side elevation view of the assembly of FIGS. 1-3 while in a closed condition with certain portions thereof and of the structure upon which it is mounted being torn away for viewing clarity.
Figure 5:
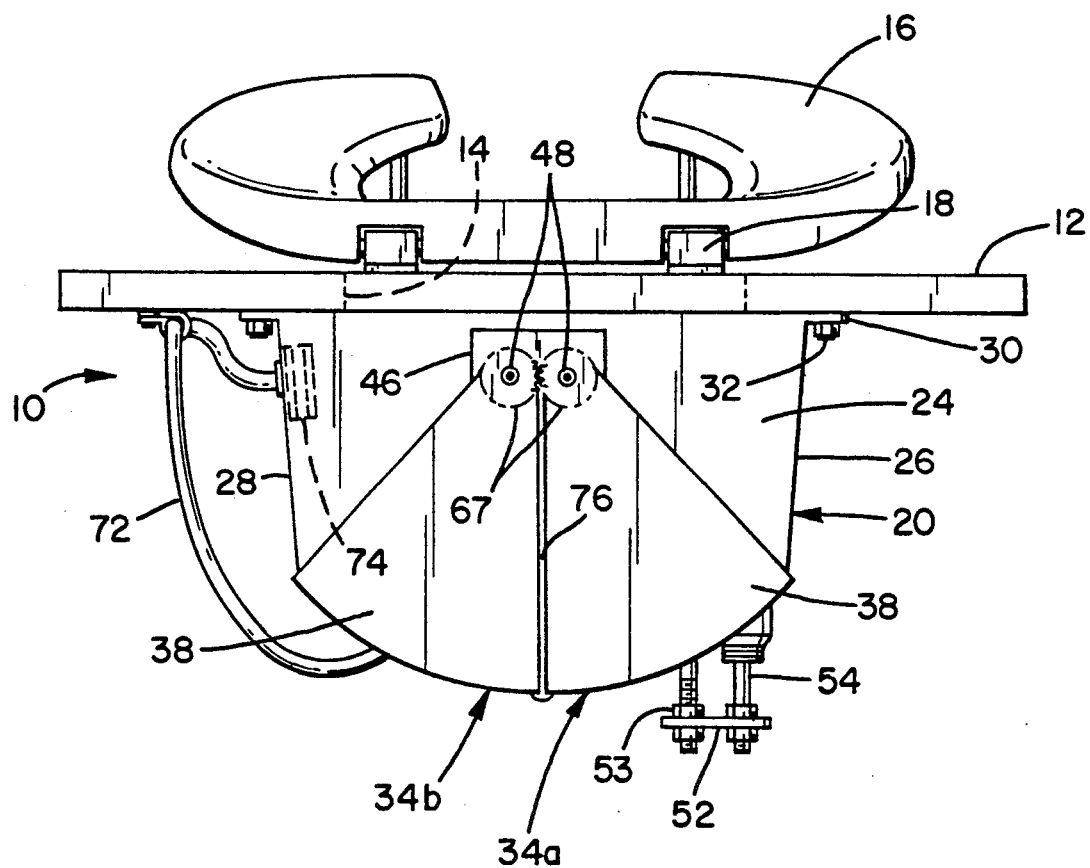
FIG. 5 shows a rear elevation view of the assembly of FIGS. 1-4 while in a closed condition.

Referring now to the drawing figures there is shown, in a preferred embodiment of my invention, a pit commode closure assembly, generally designated 10, adapted for use in combination with an outhouse bench 12 which contains an opening 14 therein aligned over a pit, and a toilet seat 16 attached by means of hinges 18 to the bench 12. The seat 16 is tiltable between a raised position extending at least diagonally with respect to the bench 12 as shown in FIGS. 1 and 4-5, and a lowered position resting flush on the bench 12 so as to at least partially surround the opening 14 as shown in FIG. 2.

The closure assembly 10 includes a four sided frame, which may be constructed of a steel or a suitably heavy gauge fiberglass plastic or the like, generally designated 20, which is open on its upper and lower ends and which is defined by a front wall 22, a rear wall 24 and two opposing side walls 26 and 28. Upper edge portions of the side walls 26 and 28 contain flanges 30 which are secured to an underside of the bench 12 by means of suitable threaded fasteners 32 such that the frame 20 surrounds or frames the opening 14. The assembly 10 also includes first and second closure means, which, in the present example comprise a pair of cradle members or sections, generally designated 34a and 34b, which, together, form a movable closure for the lower end of the frame 20. The cradle sections 34a and 34b are identical in construction and are each in the form of a wedge shaped portion of a hollow right circular cylinder, drum or barrel. Each of the sections 34a and 34b have wedge or pie shaped front and rear end walls 36 and 38, respectively, characterized by a rounded apex end 40 and an arc shaped base 42, and an elongated base member 44 which is arc shaped in transverse cross section, similar to the arcuate shape of the bases 42 of the corresponding end walls 36 and 38 to which it is joined on opposite ends thereof. The apex ends 40 of the front and rear end walls 36 and 38 of each of the sections 34a and 34b are pivotally connected immediately next to one another through reinforcement plates 46 which are welded or otherwise suitably affixed to an upper central end portion of the front and rear frame walls 22 and 24. The plates 46 also act as spacers to separate major surface portions of the movable front and rear end walls 36 and 38 from the stationary front and rear walls 22 and 24 respectively, of the frame 20 so that they do not frictionally slide against one another. Pivot pins 48 permit the sections 34a and 34b to tilt between a normally closed position against one another, wherein the lower end of the frame 20 is sealed shut as shown in FIGS. 1 and 3-5, and an open position wherein the base members 44 of the sections 34a and 34b are rotated upwardly away from one another out of registry with the lower end of the frame 20 and to the sides thereof as shown in FIG. 2.

One side of a frontal portion of the seat 16 bears downwardly upon an upper end of a first vertically movable plunger 50 which passes through the bench 12 and is movably mounted thereto. A lower end of the plunger 50 is connected by a plate 52 and jam nut 53 to a lower end portion of a vertically movable piston rod 54 which projects from a lower end of a conventional single acting air cylinder 56. A plate 58 containing a horizontally extending slot 60 is fixedly attached to a central portion of the plunger 50 for vertical movement therewith. An upper end of the cylinder 56 is attached to the underside surface of the bench 12. An adjustable air valve 62 is connected to an air passage in the upper end of the cylinder 56 to permit adjustment of the rate of escape of air from the cylinder 56 as its piston retracts upwardly therein. A suitable example of the cylinder 56 is that sold in the United States at the present time as Model No. BR-042-D as manufactured by Bimba Mfg., Inc., of RFD 50 North, P.O. Box 68, Monee, Ill. 60449. A suitable example of the air valve 62 is a Model No. EF-10-B as manufactured by Deltrol, Inc., of 3001 Grant Avenue, Bellwood, Ill. 60104.

An elongated rigid bar 64 containing a pin 66 projecting transversely from one end portion thereof into the slot 60 is affixed at its opposite end, as by a weld, suitable threaded fasteners or the like, to the front end wall 36 of the cradle 34b. Notice that the bar 64 extends diagonally upwardly and away from the vertical centerline of the cradle closure 34 when the latter is in its closed position as shown in FIG. 1. Now, as the seat 16 is forced downwardly from its raised position, as in FIG. 1, to its lowered position, as in FIG. 2, the plunger 50 and attached plate 58 are forced downwardly, whereupon the pin 66 moves outwardly along the slot 60 (from left to the right as viewed in FIGS. 1-2) as a consequence of the rigid bar 64 maintaining its fixed angular relationship to the cradle 34b to which it is fixedly attached. Accordingly, the end of the bar 64 which contains the pin 66 tilts downwardly and its opposite end tilts upwardly, all in a counterclockwise direction as viewed, as the pin 66 slides to the right along the slot 60 as viewed. Thus, the cradle 34b tilts in a counterclockwise direction as viewed from its normally closed position as in FIG. 1 to its open position as in FIG. 2. Simultaneously, a gear 67 fixedly attached on the rear end wall 38 of the cradle section 34b around its pivot pin 48 drives the companion follower gear 67 which is fixedly attached on the rear end wall 38 of the cradle 34a around its pivot pin 48 to cause the cradle 34a to tilt in the opposite direction (clockwise as viewed) toward its open position. Accordingly, the cradle section 34a always tilts in response to a tilting movement of the section 34b but always in a direction opposite to the direction of tilt of the latter.

As the seat 16 is tilted downwardly, it also bears upon a second vertically movable plunger 68 to dispense a suitable disinfectant, deodorant or the like from a suitable dispenser 70 attached to the underside of the bench 12 through a line 72 into an absorbent pad 74 removably disposed in a suitable bracket affixed to the interior side wall 28 of the frame 20. The dispenser 70 should contain a spring to bias the plunger 68 to a normally raised position, as shown in FIG. 1, when the seat 16 is raised or is otherwise in a raised position.

After the seat 16 has been depressed and weight is then removed therefrom, the plunger 50 is moved upwardly by the bar 64 to lift the seat 16 to its raised position as the sections 34a and 34b return to their closed positions. The spring bias of the dispenser 70 also lifts the plunger 68. As the plunger 50 is lifted, the plate 58 also rises, thus allowing the pin 66 to slide back toward the left in the slot 60 as the corresponding end of the bar 64 is raised. As a result, the cradle 34b returns in a clockwise direction from its open to its closed position and the gears 67 operate to simultaneously return the cradle 34a in a counterclockwise direction as viewed in FIGS. 1-2 to its closed position.

It will be appreciated that the center of gravity of each of the wedge shaped cradle section 34a and b is spaced apart from its respective pivot point so as to gravitationally bias the section toward its closed position so that such movement will naturally occur when weight is removed from the seat 16. As used herein, the term gravitational bias relates to a pivotal mass whose center of gravity is spaced from its pivot point so as to urge the mass toward a preferred position. The term is not intended to include a pivotal mass having a counterweight attached thereto which is opposite the fulcrum or pivot point from the mass itself.

To restrain the cradles 34a and b from returning too quickly and with too great a force from their open to their closed positions, thus raising the seat 16 too quickly and causing the cradles 34a and b to slam into one another when weight is removed from the seat 16, the air valve 62 can be adjusted to limit the rate at which the cylinder 56 retracts and, consequently, limit the rate at which the plunger 50 retracts and the rate at which the cradles 34a and b close under the influence of the upwardly moving plate 58. The air valve 62 will thus slow the return of the cradles 34a and b to their closed positions against one another by a satisfactory amount even where the cradles 34a and b and frame 20 are constructed of a heavy gauge steel as opposed to a much lighter fiberglass or plastic. To tightly seal adjoining edges of the cradles 34a and b against one another when in their closed positions, I recommend applying a strip 76 of flexible, compressible, resilient material such as natural or synthetic rubber or plastic to one or both adjoining edges.

Although the present invention has been described with respect to numerous specific details of a certain preferred embodiment thereof, it is not intended that such details limit the scope of this patent otherwise than as specifically set forth in the following claims.

I claim:

1. For use with a bench defining an opening therein and a toilet seat attached to said bench and being tiltable between a lowered position flush with said bench and at least partially surrounding said opening and a raised position extending diagonally with respect to said bench, a pit commode closure assembly comprising
    a frame having an open upper and lower end and being attachable against an underside of said bench to surround said opening,
    a first and second closure means pivotally connected to said frame for opening said lower end upon movement of said seat from said raised position to said lowered position and for closing said lower end upon movement of said seat from said lowered position to said raised position, each said closure means being tiltable between an open position on a different side of said frame and a closed position against the other said closure means in registry with said lower end, each said closure means having a center of gravity spaced from its pivot point so as to gravitationally bias it toward said closed position,
    first linkage means responsive to a movement of said seat from said raised position to said lowered position for tilting only said first closure means in opposition to said bias from a position closing a portion of said lower end to a position opening a portion of said lower end, and
    second linkage means separate and distinct from said first linkage means, said second linkage means being connected directly between said first and second closure means for tilting said second closure means in response to, and in a direction opposite to a direction of, movement of said first closure means.

2. The assembly of claim 1 wherein said first linkage means comprises
    plunger means adapted for insertion through said bench for movement from a first to a second position in response to a movement of said seat from a raised to a lowered position, and
    an elongated rigid member connected between said plunger means and said first closure means for moving said first closure means from said closed to said open position in response to a movement of said plunger means from said first to said second position.

3. The assembly of claim 2 wherein said plunger means comprises an elongated plunger rod aligned under one side of said seat for movement in a downward direction in response to a movement of said seat from said raised to said lowered position.

4. The assembly of claim 2 wherein said first linkage means further comprises a plate fixedly attached to said plunger means for movement therewith, said plate defining an elongated slot therein, said rigid member including a pin transversely extending from one end portion thereof and being slidably disposed in said slot, an opposite end of said rigid member being fixedly attached to said first closure member such that said rigid member tilts relative to said plunger means and said pin slides in said slot as said plate moves with said plunger means.

5. The assembly of claim 1 wherein said second linkage means comprises gear means interconnected between said first and second closure means for tiltably moving said second closure means in a rotational direction opposite to a tilting movement of said first closure means and in response to a tilting movement of said first closure means.

6. The assembly of claim 5 wherein said gear means comprises
    a first gear fixedly connected to an end wall of said first closure means around a pivot point of said first closure means for rotary motion as said first closure means moves between its said open and closed positions, and
    a second gear fixedly connected to an end wall of said second closure means which is located on the same side of said frame as the end wall containing said first gear, said second gear being connected around a pivot point of said second closure means, said second gear being responsive to rotary movement of said first gear.

7. The assembly of claim 1 wherein said first and second closure means each comprise
    a pair of spaced apart, wedge shaped panels, each of said panels having an arc shaped end and an apex, and
    an elongate base being arc shaped in transverse cross section, said base being connected between the arc shaped ends of said panels, the apex of each of said panels being pivotally connected to a different opposing wall of said frame.

8. The assembly of claim 1 wherein said first linkage means comprises
    plunger means adapted for insertion through said bench for movement from a first to a second position in response to a movement of said seat from a raised to a lowered position, and
    a rigid member connected between said plunger means and said first closure means for moving said first closure means from said closed to said open position in response to a movement of said plunger means from said first to said second position and for moving said plunger means from said second to said first position upon removal of a weight from said seat for, in turn, moving said seat from said lowered to said raised position in response to a gravitating movement of said first closure means from said open to said closed position.

9. The assembly of claim 8 wherein said plunger means comprises an elongated plunger rod aligned under one side of said seat for movement in a downward direction from a first to a second position in response to a movement of said seat from said raised to said lowered position, said plunger rod being movable in an upward direction from said second to said first position upon removal of a weight from said seat and upon movement of said first closure means from said open to said closed position, and a plate connected to said plunger rod for movement therewith, said plate defining an elongated slot therein, said rigid member having one end thereof slidably connected to the slot in said plate and having an opposite end fixedly connected to said first closure means.

10. The assembly of claim 1 further comprising dampening means responsively connected to said first linkage means for reducing the rate of movement of said first and second closure means from said open position to said closed positions upon removal of a weight from said seat.

11. The assembly of claim 10 wherein said dampening means comprises a single acting air operated cylinder.

12. The assembly of claim 11 further comprising an adjustable air valve connected to an air outlet orifice of said cylinder for adjusting the rate of closure of said first and second closure means relative to each other.

13. The assembly of claim 1 further comprising means for spraying a quantity of disinfectant/deodorant within said frame in response to a movement of said seat from said raised to said lowered position.

14. The assembly of claim 13 wherein said spraying means comprises a pump having a plunger arm adapted for insertion through said bench for alignment under a side of said seat, said plunger arm being operatable to dispense a quantity of disinfectant/deodorant upon a downward movement of said arm in response to a movement of said seat from a raised to a lowered position, said pump including a flexible hose for directing said quantity into a side of said frame clear of all positions which may be occupied by said first and second closure means.

15. The assembly of claim 14 wherein said spraying means also comprises an absorbent pad removably attached to an interior surface of said frame, said hose directing said quantity into said pad.

16. The assembly of claim 1 wherein said frame comprises a front wall, a rear wall, and a pair of opposing side walls.

17. The assembly of claim 16 wherein said first linkage means is disposed in front of said front wall and said second linkage means is disposed rearwardly of said rear wall.

18. For use with a bench defining an opening therein and a toilet seat attached to said bench and being tiltable between a lowered position flush with said bench and at least partially surrounding said opening and a raised position extending diagonally with respect to said bench, a pit commode closure assembly comprising a frame having an open upper and lower end and being attachable against an underside of said bench to surround said opening, first and second closure means tiltably connected to said frame for opening said lower end upon movement of said seat from said raised position to said lowered position and for closing said lower end upon movement of said seat from said lowered position to said raised position, each said closure means being tiltable between an open position on a different side of said frame and a closed position against the other said closure means in registry with said lower end, each said closure means having a gravitational bias toward said closed position, plunger means adapted for insertion through said bench and being movable from a first to a second position in response to a movement of said seat between a raised and a lowered position, a rigid member connected between said plunger means and said first closure means for tilting only said first closure means in opposition to said bias from said closed to said open position in response to a movement of said plunger means from said first to second positions, and means, separate and distinct from said plunger means and rigid member, connected between said first and second closure means for tilting said second closure means in a direction opposite to a tilting movement of said first closure means in response to a movement of said plunger means from said first to second position.

19. The assembly of claim 18 further comprising dampening means for reducing the rate of movement of said first and second closure means from said open to said closed positions.

20. The assembly of claim 19 wherein said dampening means comprises a single acting air operated cylinder having an air breathing orifice communicating with one end of said cylinder, and an adjustable air valve connected to said air breathing orifice for adjusting the rate of movement of said first closure means from said open to said closed position.

21. The assembly of claim 18 further comprising a plate connected to said plunger means for movement therewith, said plate defining an elongated slot therein, said rigid member including a pin extending transversely from one end thereof into said slot for slidable movement in and along said slot as said plunger means moves between said first and second positions, said plunger means being movable from said second to said first position upon removal of a weight from said seat and in response to a movement of said first closure means from said open to said closed position.

* * * * *